United States Patent [19]
Sanderson

[11] Patent Number: 5,686,797
[45] Date of Patent: *Nov. 11, 1997

[54] ELECTRONLUMINESCENT LAMP INVERTER

[75] Inventor: Stephen J. Sanderson, Royersford, Pa.

[73] Assignee: BKL, Inc., King of Prussia, Pa.

[*] Notice: The term of this patent shall not extend beyond the expiration date of Pat. No. 5,463,283.

[21] Appl. No.: 549,630

[22] Filed: Oct. 27, 1995

Related U.S. Application Data

[63] Continuation-in-part of Ser. No. 248,299, May 24, 1994, Pat. No. 5,463,283.
[51] Int. Cl.$^6$ .................................................. H05B 37/02
[52] U.S. Cl. ................ 315/209 R; 315/307; 315/DIG. 7
[58] Field of Search ................................. 315/169.3, 307, 315/205, 209 R, 224, 226, 308, DIG. 5, DIG. 7

[56] References Cited

U.S. PATENT DOCUMENTS

| | | | |
|---|---|---|---|
| 4,449,075 | 5/1984 | D'Onofrio et al. | 315/169.3 |
| 5,463,283 | 10/1995 | Sanderson | 315/209 R |

Primary Examiner—Robert Pascal
Assistant Examiner—David Vu
Attorney, Agent, or Firm—Joseph W. Molasky & Associates

[57] ABSTRACT

A circuit for providing AC power to an electroluminescent lamp powered by a battery comprises a high frequency oscillator through a control to drive a fly back voltage regulator comprising an inductor powered by a relatively low battery voltage and coupled to ground through a switching transistor. A capacitor coupled to the inductor through a diode is charged by the repetitive charge and discharge of the inductor when the transistor is switched ON and OFF at high frequency by the high frequency oscillator. The charge in the capacitor is dithered about a high DC voltage, such as 100 VDC, by sensing the charged voltage for periodically turning the transistor ON and OFF accordingly. A bridge circuit receives two pairs of like lower frequency square wave pulse signals of opposite polarity from a low frequency oscillator. Each signal is applied to a different one of two series connected legs of two opposite like branches, each branch coupled between the high DC voltage and ground, each leg containing two switching FET transistor and a current source. An electroluminescent lamp is connected between the legs in each branch. One of the legs in each branch is alternately turned ON and the other leg turned OFF by the square wave signals to provide the equivalent of an AC signal to the electroluminescent lamp in opposing directions, thereby doubling the value of the peak stepped up DC voltage.

11 Claims, 5 Drawing Sheets

ELECTRONLUMINESCENT LAMP INVERTER

This is a continuation-in-part of Ser. No. 08/248,299 filed May 24, 1994, which issues as U.S. Pat. No. 5,463,283 on Oct. 31, 1995.

This invention relates to AC electroluminescent lamp drive circuits and, in particular, to circuits operated from battery sources.

BACKGROUND OF THE INVENTION

Electroluminescent (EL) lamps require AC voltage of a certain amplitude and frequency; therefore in battery powered equipment, EL lamps require a DC to AC inverter.

Unfortunately, however, such inverters require large, relatively costly transformers and many components, or an external signal source, to control the frequency, and this makes them relatively expensive to operate.

Accordingly, there is a need for an inexpensive, small size means by which to power an EL lamp from a single cell inexpensive battery of about 1.5 volts.

Also, in order to power an EL lamp to a minimum of 5 foot-lamberts brightness and, preferably, 10 foot-lamberts brightness, a DC to AC inverter of sufficiently high voltage is needed.

Accordingly, there is need for a system in which a single cell battery can be used to provide an EL lamp of 5-10 foot lambert brightness without having to employ large and expensive transformers.

One example of a system which uses battery means to power EL lamps is the drive circuit described by P. Kindlmann in U.S. Pat. No. 4,527,096.

Kindlmann shows a converter equipped with an inductor for stepping up the battery voltage to successively higher levels to progressively charge the lamp capacitor.

In this system, the charge from the inductor is fed directly into the capacitor and all of the energy is delivered directly to the lamp. An external oscillator means drives the inductor and every pulse out of the inductor is discharged into the capacitor. In this way, the lamp is step-charged until it reaches a predetermined number of successive charging current pulses.

By contrast, the present invention and the invention described and claimed in my U.S. Pat. No. 5,463,283 does not depend on current pulses.

Instead, energy from the inductor is stored in a capacitor, and the stored voltage is used to charge the EL lamp by a constant current.

A stand-alone inverter eliminates the need for an external oscillator or control means for driving the inductor and the energy from the inductor is fed into a storage capacitor to afford what is basically a DC to DC converter of high voltage. This voltage is then used to charge an EL lamp in one direction via a bridge circuit and discharge it in the other. In this way, it is possible to generate relatively high DC voltages without damaging the integrated circuit.

As a result, the current and the frequencies at which EL lamps are driven can be controlled so that a variety of lamps of various sizes can be operated from one integrated circuit.

SUMMARY OF THE INVENTION

The present invention improves upon the prior art by providing the user with means for controlling the oscillator in the DC to DC converter. By providing such means, the oscillation frequency can be more accurately controlled and this enables the designer to select one inductor value to support a variety of lamps. Moreover, as a result of this ability to control oscillation frequency, the designer may now regulate the current to fit a desired power budget.

This invention provides a drive circuit that can power an EL lamp from a single cell as, for example, a 1.5 VDC battery. The circuit includes:

a) a DC to DC converter that provides a high DC first DC voltage of a given value voltage from a relatively low, second DC voltage;

b) a DC to AC inverter that converts the first high DC voltage to an AC voltage sufficient to power a capacitive EL lamp so that it emits light of the desired brightness;

c) a constant current source bridge circuit that is switched at a low frequency by an internal oscillator and control circuit that alternately charges the EL lamp to one polarity, discharges completely and charges to the opposite polarity, effectively making the peak to peak voltage twice that of the high DC voltage.

One object is to produce a high D.C. voltage that can be stored and used to alternatively charge and discharge an EL lamp.

Another object is to provide a bridge-type circuit for charging the capacitance of an EL lamp with constant current and produce a ramp voltage across the EL lamp terminals.

The DC to DC converter uses a fly-back topology so that it is switched at a high frequency by an internal oscillator which allows the inductor size to be small.

In this way, an EL lamp can be powered up to about 10 foot lamberts brightness from a battery of 3 VDC to 12 VDC. Further, a relatively small, transformerless DC to AC inverter is provided that requires no external signal means for use in battery operated equipment.

Yet another object is to provide a new 14 pin system which adds an external control for controlling oscillator frequency.

DETAILED DESCRIPTION OF THE INVENTION

According to the present invention, the DC to DC converter means comprises high frequency oscillator means for generating an oscillating signal for a driver control, an inductor for receiving the low second voltage at one terminal thereof, switch means responsive to the oscillating signal coupled between the inductor at a second terminal thereof and a reference potential, a diode including an anode and a cathode having its anode connected to the second terminal, and capacitor means coupled between the cathode and the reference potential whereby the potential at the cathode with respect to the reference potential comprises the first DC voltage.

The means for converting the first DC voltage to an AC voltage comprises bridge circuit means having a pair of branches, the bridge circuit means having first and second nodes for receiving the first voltage thereacross, the bridge circuit means having fifth and sixth nodes each between the first and second nodes in separate branches, each branch including connector means for receiving and connecting the lamp to the fifth and sixth nodes, switch means between each pair of nodes, and means are coupled to the switch means for alternately coupling one of the fifth and sixth nodes to the first node and the other of the fifth and sixth nodes to the second node in one relative polarity and, then, in a second relative polarity, coupling one of the fifth and sixth nodes to the second node and the other of the fifth and sixth nodes to the first node to thereby apply the first DC voltage in alternate polarities to the fifth and sixth nodes.

One embodiment of this invention (FIG. 3) provides for an improvement on the drive circuit system described and claimed in my U.S. Pat. No. 5,463,283.

In U.S. Pat. No. 5,463,283, there is described and claimed a DC to AC converter in die form and an 8 pin surface mount. In that system, the high frequency oscillator is internally controlled and not user adjustable because only 8 pins are available for output; one pin is for Vdd, one pin is ground, one for L1, one for $C_S$, another for $R_{OSC}$, another for $R_{CONTROL}$, and two pins for the EL lamp.

The difficulty with the die form inverter and 8 surface mount assembly is that oscillator frequency is determined internally by the IC and cannot be controlled by the user.

Figure 4:
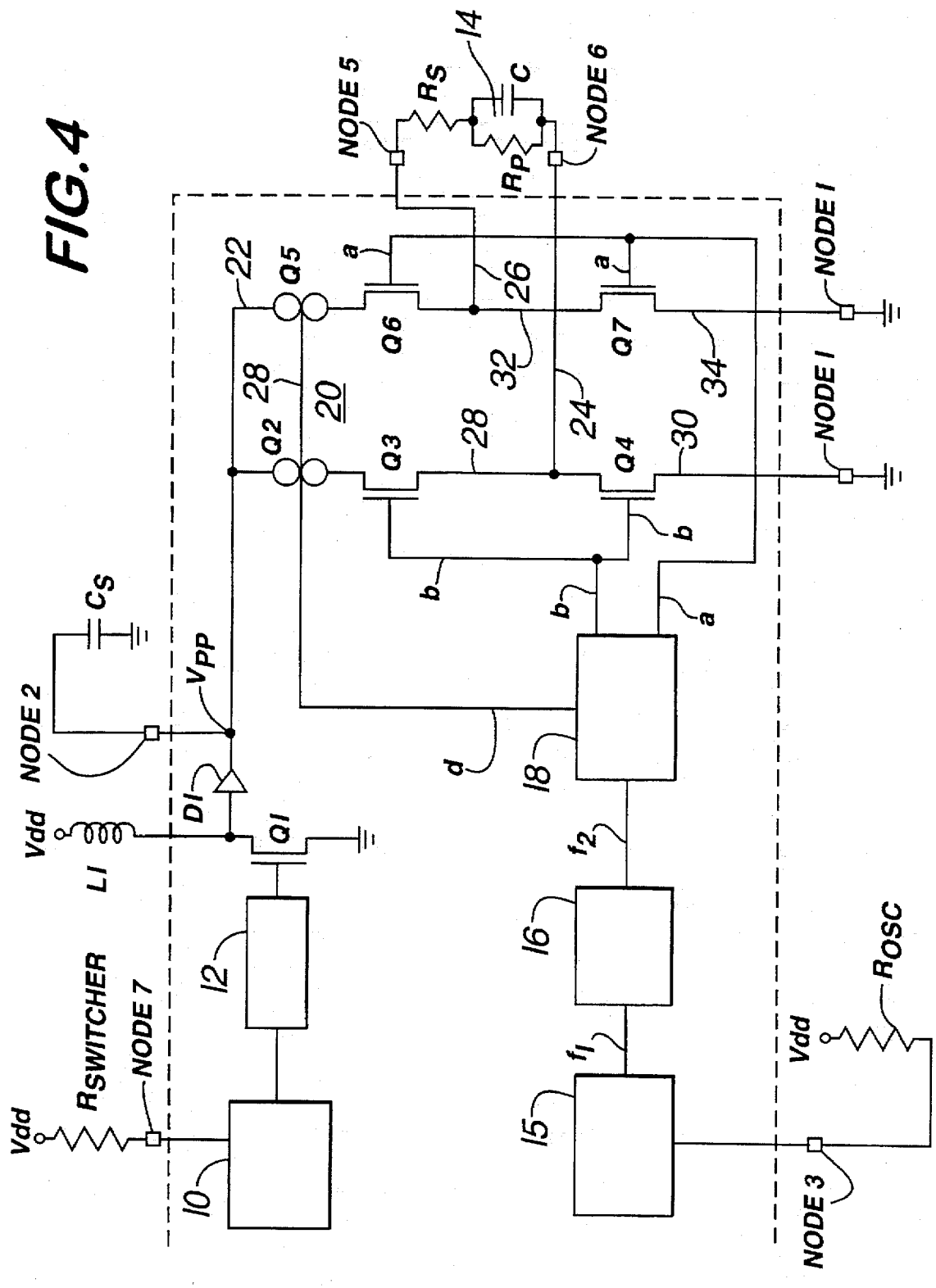
FIG. 4 is a block diagram of a circuit having only oscillation control means.

The present invention overcomes this difficulty by adding a pin, node 7, for switch frequency control (hereinafter, "$R_{SWITCHER}$"). Also, the pin which is internally fixed in U.S. Pat. No. 5,463,283 is, in this case, absent as shown in FIG. 4.

Accordingly, the IC inverter herein described now includes a 14 pin surface mount so that the present invention now covers an 8 pin surface mount, a 14 pin surface mount, and die form package.

Figure 3:
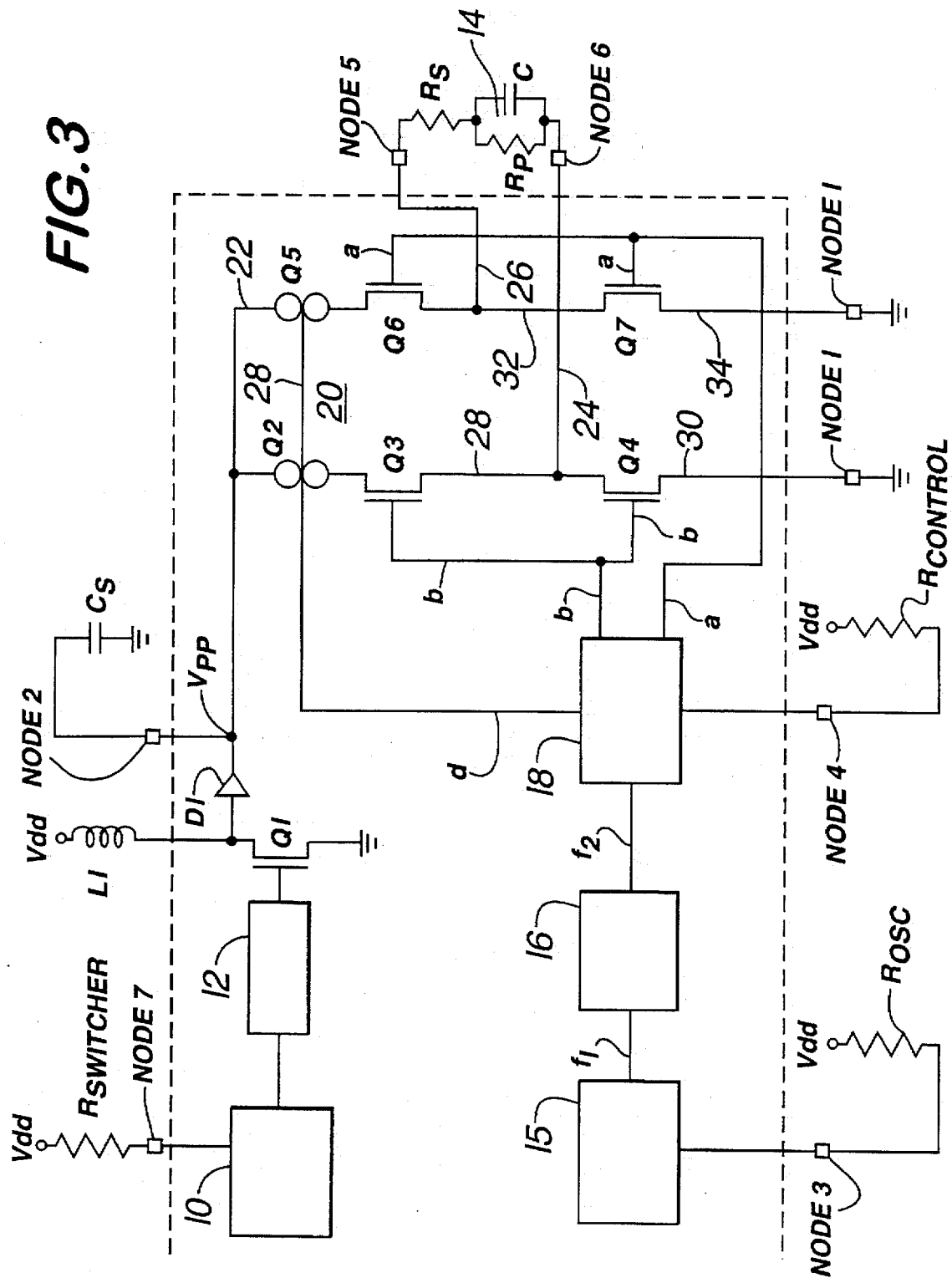
FIG. 3 is a block diagram of a circuit having both oscillation control means and constant current control means.

An 8 pin surface mount IC may also be used with oscillation control means provided that a pin is freed-up from the embodiment shown in FIG. 3. In FIG. 4, for example, the $R_{CONTROL}$ has been removed thereby eliminating the external control for the constant current. This provides a pin for $R_{SWITCHER}$, and thus an external control means for the oscillator.

Figure 5:
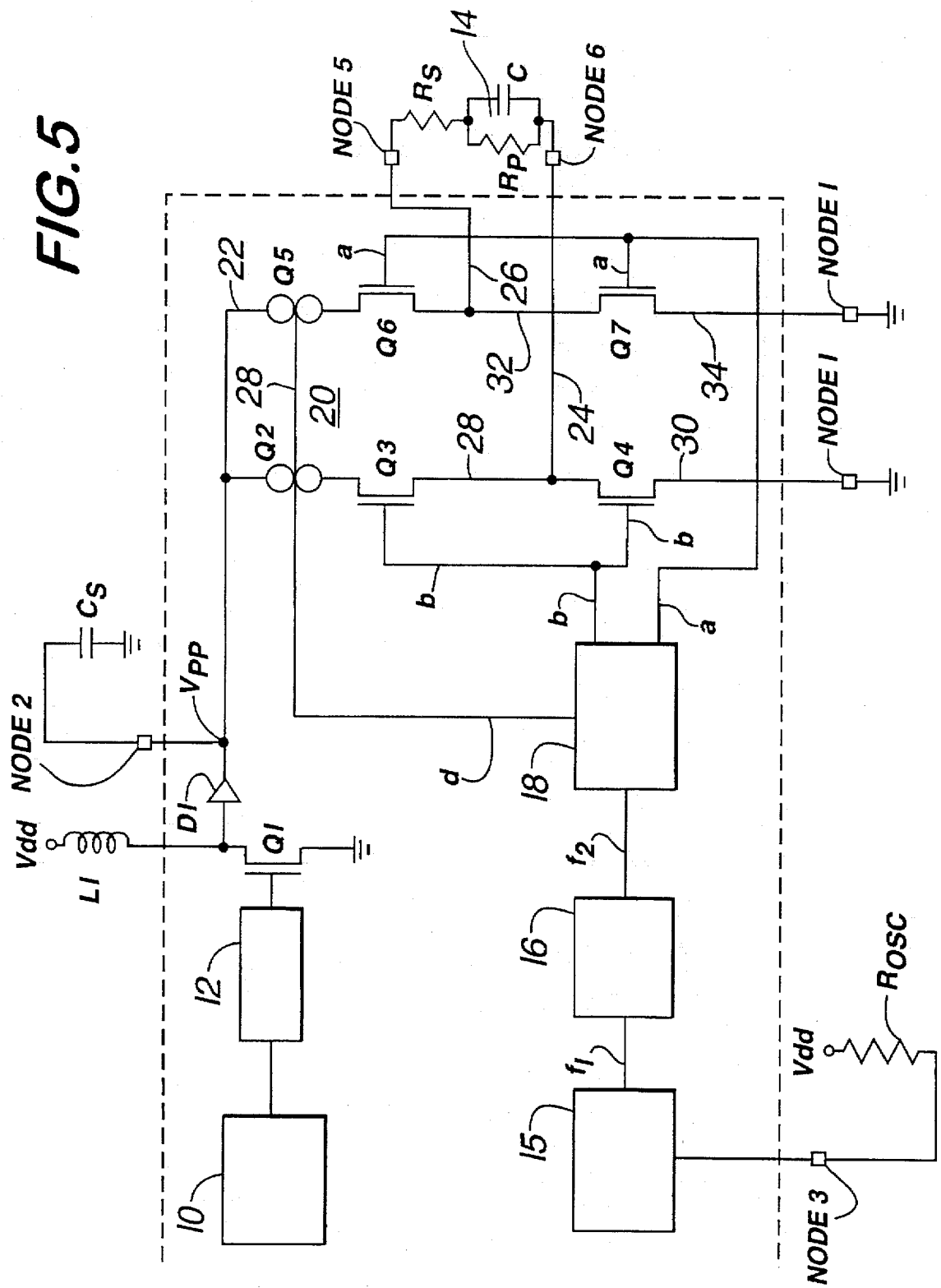
FIG. 5 is a block diagram of a circuit having neither oscillation control means nor constant current control means.

In yet another embodiment, as shown in FIG. 5, the control means for both the oscillation means and the constant current means have been eliminated. This allows the current and voltage levels of the system to be served by the particular properties of the circuit components and this may be tolerable in certain applications where flexibility of powering various size EL lamps at optional conditions is a secondary concern.

DESCRIPTION OF THE PREFERRED EMBODIMENT

Figure 1:
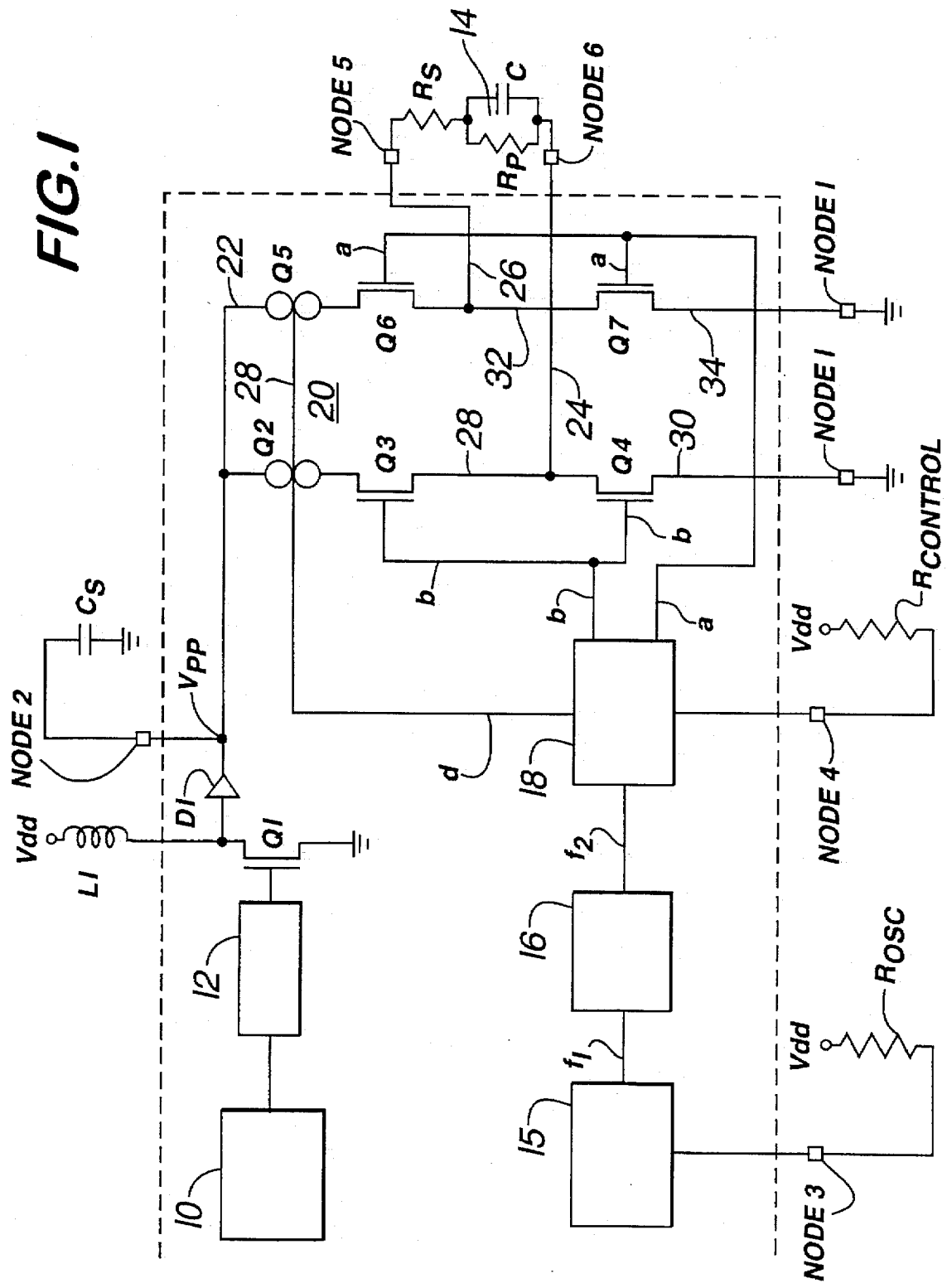
FIG. 1 is a block diagram of a circuit having only constant control means.

In the IC inverter circuit of FIG. 1, there is shown a high frequency oscillator 10 of relatively high frequency and, more particularly, an oscillator of from about 20 Khz to 125 Khz but not necessarily one limited to this range which generates an oscillating square wave output signal for activating the driver control 12. The high frequency oscillator frequency is determined internally by the IC.

A variation on this design provides for an external control of the high frequency oscillator. In this variation the frequency is determined by the value of the $R_{SWITCHER}$, which is connected to node 7, as shown in FIG. 3. The value of the $R_{SWITCHER}$ determines frequency.

One benefit of an external control is a tighter tolerance of the high frequency because IC fabricated resistors have a much greater tolerance than do discrete resistors and this allows the designer to select one inductor value for all IC's.

Another benefit of the external control is economy because it gives a designer the ability to make the input current fit a desired power budget. This is made possible because the boost converter consumes a large portion of the overall current draw of the IC inverter and it is the high frequency oscillator and the inductor which determine current draw. This driver control regulates the boost converter operation by controlling the ON-time and OFF-time of an FET transistor Q1. Driver control 12 includes a comparator for producing a high frequency output gate drive signal of from about 20 Khz to 125 Khz (although broader ranges are also possible), and this is applied to the gate of the FET transistor Q1 for alternately making transistor Q1 conductive and nonconductive in accordance with the sensed value of Vpp applied to the driver control 12. When Vpp reaches a threshold voltage between 80 VDC and 100 VDC, the driver control circuit 12 cuts OFF the gate drive to Q1, thereby ceasing the operation of the boost converter. When vpp drops below this threshold, the driver control 12 then allows the high frequency oscillator 10 to drive the gate of Q1 and the boost converter function continues until Vpp again reaches between 80 VDC to 100 VDC. Therefore, Vpp is a regulated voltage whose value is fixed within the IC and can range from about 80 VDC to about 100 VDC. This configuration increases the efficiency of the inverter because the boost converter is only turned ON when it is needed.

Still another embodiment provides for making the Vpp voltage non-regulatable so as to be able to generate voltages higher than 100 VDC.

The drain-source electrodes of Q1 are connected between an inductor L1 and a reference potential, e.g., system ground. Inductor L1 receives the potential from a battery, (not shown) as, for example, a 3 VDC to 12 VDC battery source. Also, this control current may be fixed internally to the IC so as to eliminate an external component; a feature which is also meant to be an embodiment of this invention.

The junction between the inductor L1 and the transistor Q1 is connected to the anode of diode D1 to system ground through a capacitor Cs. The junction between the diode cathode and the capacitor Cs exhibits the desired stepped up DC voltage Vpp. When the transistor Q1 is turned ON, current flows through the inductor L1, thereby charging the inductor Li. When the transistor Q1 is turned OFF, the energy stored therein transfers through diode D1 and charges the capacitor Cs to a relatively high voltage Vpp, e.g., 80 to 100 VDC, which is regulated. The converter comprising the inductor L1, the transistor Q1, the diode D1 and the capacitor Cs are referred to as a boost-type DC to DC converter.

The voltage Vpp at the cathode of the diode D1 is fed back to the driver control 12 which senses the magnitude of the value of Vpp. When the value falls below about 90 VDC, the switch transistor Q1 is turned ON and OFF at the high frequency by the signal from the high frequency oscillator 10. When the value goes above 90 VDC, the oscillating signal to the transistor Q1 is turned OFF. This regulates Vpp at about 100 VDC.

The duty cycle of the high frequency oscillator 10 determines the magnitude of the energy stored in the inductor L1 and, therefore, the magnitude of the voltage Vpp. It is preferred that the duty cycle be about 90%. The high potential is needed to energize the EL lamp 14 connected to the circuit and to illuminate the lamp.

Figure 2:
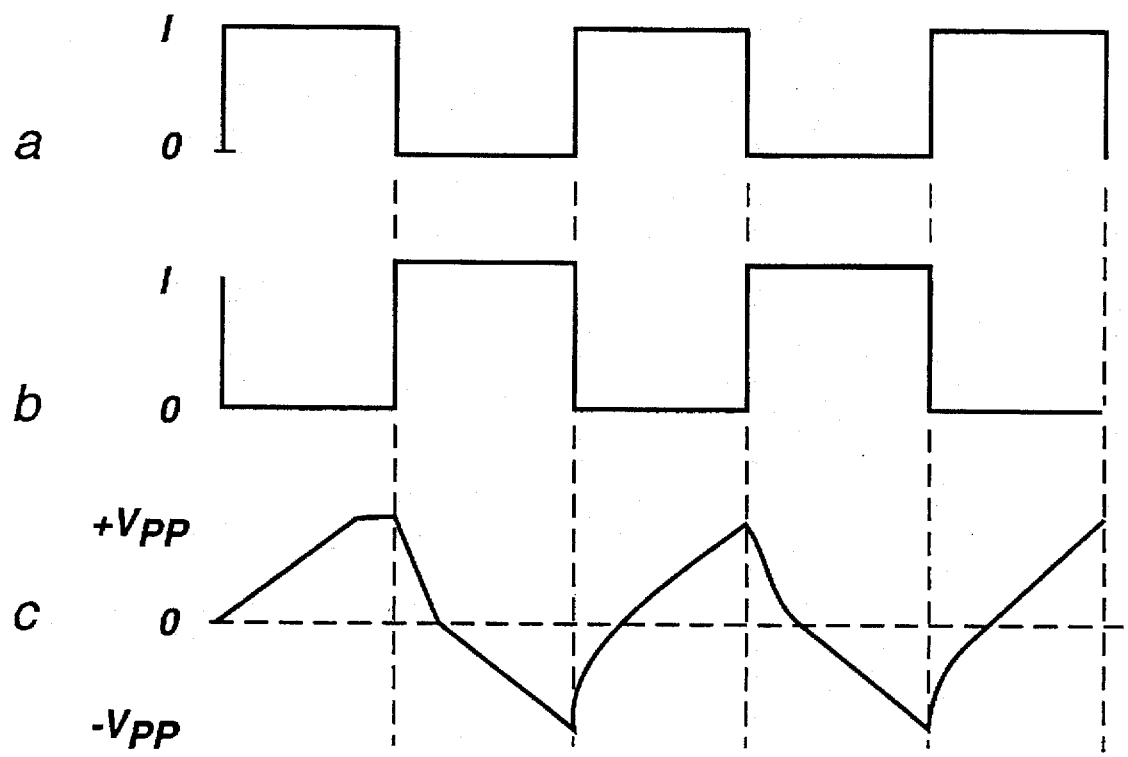
FIG. 2 is a timing diagram which explains the principles of the invention.

The low frequency oscillator 15 output signal f1 is divided down by a divider 16 into a low frequency output signal f2. Preferably this is at about a 50% duty cycle. The value of f2 is determined by the value of resistor $R_{OSC}$. Preferably f2 is about 400 Hz in this embodiment. The signal f2 is applied to a control 18 which controls the switching of signals "a" and "b" (see FIG. 2).

The control 18 is a function block and it controls a bridge. It accepts the low frequency signal f2 and includes a drive to generate signal "a" which is in phase with the low frequency signal. This "a" signal drives the gates of one-half of the bridge. The control 18 also includes a means to provide an inverted signal "b" driver, which is 180 degrees out of phase with signal "a", for driving the gates of the second one-half of the bridge. The output of the control 18 is a pair of like-square wave pulse train signals "a", and a pair of like-square wave pulse train signals "b", which are identical except that the phase of signals "a" and "b" are 180° apart (see FIG. 2). A further output of the control 18 is a constant current source control "d". The constant current control "d" controls Q2 and Q5, which can be N-channel depletion mode MOSFET high voltage DMOS transistors configured as current sources. A control, $R_{CONTROL}$ controls the gate voltage to Q2 and Q5, thus controlling the constant current. This is shown as line 28.

The signals Vpp, "a", "b" are applied to a bridge circuit 20. The bridge circuit 20 comprises a node 2 connected to the junction of the capacitor Cs with the diode D1 to receive a voltage Vpp. The node 2 is connected to a node 6 through a current source Q2 and the drain-source electrodes of an FET transistor Q3. The node 6 includes a connector 24 for receiving one set of end terminals of the EL lamp 14. The current source Q2 is controlled by $R_{control}$ which controls the gate voltage of Q2. One of the "b" signals is applied to the gate electrode of the transistor Q3 for turning ON Q3 in the presence of a low pulse of the signal "b". A leg 24 is coupled to system ground through the drain-source electrodes of an FET transistor Q4. The gate electrode of the transistor Q4 receives signal "b". Thus, the transistor Q3 and the source Q2 form one leg 28 of the bridge circuit 20 between nodes 2 and 6; and Q4 forms a second leg 30 of the bridge circuit 20 between the node 6 and system ground. The two legs 28, 30 comprise one branch of the bridge circuit 20.

A second branch of the bridge circuit 20 includes a leg 32 between node 2 and a node 5 and a further leg 34 between the node 5 and system ground. The legs 32 and 34 are the same as, and mirror images of, legs 28 and 30, and contain identical components in this embodiment. The leg 32 comprises a FET transistor Q6 whose drain-source electrodes are connected in series with a current source Q5 between the nodes 2 and 5. The leg 34 comprises an FET transistor Q7 whose drain-source electrodes are connected between the node 5 and system ground. As mentioned, all of the current sources are controlled by control $R_{CONTROL}$ which controls the gate voltage of Q2 and Q5. The gate electrode of the transistor Q7 receives signal "a" and the gate electrode of the transistor Q6 receives signal "a". Consequently, Q3 and Q6 are ON and OFF simultaneously in response to signal "b" and "a". Signals "a" and "b" are 180° out of phase with each other, as shown by curves "a" and "b" (see FIG. 2). A second lamp receiving connector 26 is at the node 5 for receiving a second set of EL lamp 14 terminals.

The bridge circuit 20 effectively converts the high DC voltage Vpp into the equivalent of an AC voltage by applying reverse polarity signals to the EL lamp 14 in a manner similar to an applied AC voltage. The frequency is that of signals "a" and "b", preferably 400 hz. Initially, the EL lamp 14 is discharged. When signals "a" are high, the signals "b" are low, and vice versa. With the transistors Q3 and Q7 ON, and the transistors Q4 and Q6 OFF, the EL lamp 14, having an equivalent circuit of a resistance Rs in series with parallel resistance $R_{4P}$ and capacitance C, charges via the Vpp signal through the transistors Q3 and Q7 at a rate determined by a resistance $R_{CONTROL}$. The value of $R_{CONTROL}$ determines the current generated by the constant current sources. The lamp continues to charge to a peak voltage determined by the value of voltage Vpp (see FIG. 2) or until the charge current is removed.

When signal "a" goes low, signal "b" goes high, turning ON the transistors Q6 and Q4, and turning OFF the transistors Q3 and Q7. This action causes the EL lamp 14 to discharge through the transistor Q4 and then charge through the transistors Q4 and Q6 to the opposite polarity. The charge rate and peak voltages are determined as explained above. The signal "a" will then go high, turning ON the transistors Q7 and turning OFF the transistors Q4 and turning ON the transistor Q3. The EL lamp 14 at this time discharges through the transistor Q7 and the cycle then repeats. The resultant waveform "c" (see FIG. 2) comprises a linear up ramp followed by an exponential capacitance discharge down ramp to a linear down ramp followed by an exponential capacitance discharge up ramp and so on.

Referring to FIG. 1, all of the components within the dashed line are part of the integrated circuit. Thus, the only external components are L1, $C_S$, $R_{OSC}$, $R_{CONTROL}$, and the EL lamp.

Preferably, the transistor Q1 is a CMOS high voltage switch. The current sources Q2 and Q5 may be N-channel depletion mode MOSFET high voltage DMOS transistors configured as current sources. The FET transistors Q3 and Q6 may be high voltage DMOS p-channel enhancement mode FETS configured as switches, and Q7 may be high voltage DMOS n-channel enhancement mode FET transistors configured as a switch. The time from the beginning of the discharge of the EL lamp 14 to the opposite polarity peak is preferably ½ the frequency period. Thus, the transistors Q3 and Q7 are ON at about ½ the frequency rate, which for that time, discharges the EL lamp 14 and charges it to one of two polarities. The oscillating frequency of the high frequency oscillator 10 is controlled by the resistor $R_{OSC}$. Waveforms of shapes other than waveform "c", e.g., square waves, may be used, but are relatively inefficient because of high peak currents in the EL lamp 14 which cause higher losses in the lamp's equivalent series resistance Rs and the series resistances of the switching transistors Q3 and so on.

Compensation due to the lamp's aging is accomplished in accordance with the invention because as the EL lamp 14 ages, the equivalent capacitance, C, reduces in value and the equivalent parallel resistance, $R_P$, increases in value. The reduction in the C value causes the slew rate dv/dt to increase, thus, causing the peak voltage to increase and/or the RMS voltage to increase if the peak voltage is at Vpp. The EL lamp 14 then "sees" a higher voltage thereby tending to maintain the brightness level constant.

The values of C, $R_P$, and Rs depend upon the size of the EL lamp, the shape of the EL lamp, the properties and characteristics of the layers used to make the EL lamp 14, and the drive conditions. These values are expressed as per $in^2$ of lit area. The lamp capacitance C can vary from 1.5 $nF/in^2$ to 6 $Nf/in^2$. The parallel resistance $R_{PP}$ can vary from 50 Kohms/in² to 1.5 Mohms/in². The series resistance Rs can carry from 100 ohms/in² to 1000 ohms/in². The capacitance increases as the lit area increases and the resistances decrease as the lit area increases. The present circuit can provide power from 0.5 in² to 10 in² of EL lamp lit area. A typical load for one kind of lamp construction powered at 50 vrms/400 Hz is $C=3nF/in^2$, $R_p=500$ Kohms/in², and Rs=1000 ohms/in².

While the preferred embodiments have been fully described and depicted for the purposes of explaining the principles of the present invention, it will be appreciated by those skilled in the art that modifications and changes may be made thereto without departing from the scope of the invention set forth in the appended claims.

What is claimed is:

1. A DC to AC inverter device for illuminating an electroluminescent lamp manifesting a parallel resistance-capacitance in series with a resistance, which comprises:

connector means for receiving said lamp;

DC to DC converter means having high frequency oscillator means, inductive means and capacitive means configured for generating a relatively high, first DC voltage of a given value from a relatively low, second DC voltage;

constant current means coupled to said DC to DC converter for providing switching means with said first DC voltage at a constant current; and switching means coupled to said constant current means for applying alternating polarity signals of said first DC voltage at said constant current to said connector means such that said lamp sees an AC voltage, said AC voltage alternately charging and discharging said lamp, said constant current resulting in a ramp voltage waveform during said charging.

2. The device of claim 1 wherein said constant current control means is coupled to said constant current means for selecting said constant current.

3. The device of claim 1 wherein said constant current control means comprises an externally mounted user adjustable control.

4. The device of claim 1 wherein said constant current control means is internally fixed to maintain a predetermined constant current.

5. A DC to AC inverter device for illuminating an electroluminescent lamp manifesting a parallel resistance-capacitance in series with a resistance, which comprises:

connector means for receiving said lamp;

DC to DC converter means having high frequency oscillation means, inductive means, and capacitive means configured for generating a relatively high, first DC voltage of a given value from a relatively low, second DC voltage;

oscillator control means coupled to said high frequency oscillation means for controlling the oscillation frequency;

constant current means coupled to said DC to DC converter for providing switching means with said first DC voltage at a constant current;

switching means coupled to said constant current means for applying alternating polarity signals of said first DC voltage at said constant current to said connector means such that said lamp sees an AC voltage, said AC voltage alternately charging and discharging said lamp, said constant current resulting in a ramp voltage waveform during said charging.

6. The device of claim 5 wherein said oscillation control comprises an externally mounted user adjustable control.

7. The device of claim 5 wherein said oscillator frequency is in the range of from about 20 Khz to 125 Khz.

8. The device of claim 5 wherein said constant current means is internally fixed to maintain a predetermined constant current.

9. A DC to AC inverter device for illuminating an electroluminescent lamp manifesting a parallel resistance-capacitance in series with a resistance; which comprises:

connector means for receiving said lamp;

DC to DC converter means having high frequency oscillation means, inductive means, and capacitive means configured for generating a relatively high, first DC voltage of a given value from a relatively low, second DC voltage;

oscillator control means coupled to said high frequency oscillation means for controlling the oscillation frequency;

constant current means coupled to said DC to DC converter for providing switching means with said first DC voltage at a constant current;

constant current control means coupled to said constant current means for selecting said constant current; and switching means coupled to said constant current means for applying alternating polarity signals of said first DC voltage at said constant current to said connector means such that said lamp sees an AC voltage, said AC voltage alternately charging and discharging said lamp, said constant current resulting in a ramp voltage waveform during said charging.

10. The device of claim 9 wherein said oscillation control means and said constant current control means each comprises an externally mounted user adjustable control.

11. The device of claim 9 wherein said oscillator frequency is in the range of from about 20 Khz to about 125 Khz.

* * * * *